(12) United States Patent
Horn (10) Patent No.: US 11,988,235 B2
(45) Date of Patent: May 21, 2024

(54) CLIP AND A MOTOR VEHICLE PROVIDED WITH THE CLIP

(71) Applicant: Bayerische Motoren Werke Aktiengesellschaft, Munich (DE)

(72) Inventor: Enrico Horn, Gerolsbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 340 days.

(21) Appl. No.: 17/602,229

(22) PCT Filed: Mar. 19, 2020

(86) PCT No.: PCT/EP2020/057630
§ 371 (c)(1),
(2) Date: Oct. 7, 2021

(87) PCT Pub. No.: WO2020/207742
PCT Pub. Date: Oct. 15, 2020

(65) Prior Publication Data
US 2022/0186771 A1 Jun. 16, 2022

(30) Foreign Application Priority Data
Apr. 12, 2019 (DE) ...................... 10 2019 109 763.0

(51) Int. Cl.
*F16B 2/20* (2006.01)
*B60J 5/10* (2006.01)
(Continued)

(52) U.S. Cl.
CPC ................ *F16B 2/20* (2013.01); *E05B 79/20* (2013.01); *E05B 83/26* (2013.01); *F16C 1/262* (2013.01); *B60J 5/10* (2013.01); *F16C 2326/01* (2013.01)

(58) Field of Classification Search
CPC ... B60J 5/10; B60J 5/101; F16C 1/262; F16B 2/20; F16B 2/22; E05B 83/26; H02G 3/32
(Continued)

(56) References Cited

U.S. PATENT DOCUMENTS 3,398,600 A * 8/1968 White ...................... F16C 1/14
74/502
4,011,770 A * 3/1977 Webb ...................... F16C 1/262
248/74.3
(Continued)

FOREIGN PATENT DOCUMENTS

CN 1420142 A * 5/2003 ............. C08L 59/00
CN 101981358 A 2/2011
(Continued)

OTHER PUBLICATIONS

PCT/EP2020/057630, International Search Report dated Jul. 1, 2020 (Three (3) pages).
(Continued)

*Primary Examiner* — Dennis H Pedder
(74) *Attorney, Agent, or Firm* — Crowell & Moring LLP (57) ABSTRACT

A clip includes a housing with a passage opening and a closed frame where the housing is surrounded by the closed frame or the housing is a constituent part of the closed frame. The closed frame has two laterally running portions and the two laterally running portions are connected to one another by an arcuate portion which is formed opposite the housing. The closed frame has a spring action and is deformable elastically at a level of the two laterally running portions. A respective projection which protrudes from the clip and which is engageable at an intended assembly point with a
(Continued)

hooking-behind action is formed on the two laterally running portions on an outer surface of the clip pointing away from the closed frame.

9 Claims, 8 Drawing Sheets (51) Int. Cl.
  *E05B 79/20* (2014.01)
  *E05B 83/26* (2014.01)
  *F16C 1/26* (2006.01)
(58) Field of Classification Search
  USPC .................................. 296/56, 146.8, 106
  See application file for complete search history.

(56) References Cited

U.S. PATENT DOCUMENTS

| | | | |
|---|---|---|---|
| 4,294,133 A | | 10/1981 | Hurley |
| 4,334,659 A | | 6/1982 | Yuda |
| 4,438,552 A | * | 3/1984 | Omata ................. F16B 21/086 24/581.1 |
| 5,172,878 A | * | 12/1992 | Lederman ............... F16L 3/127 24/453 |
| 6,105,216 A | | 8/2000 | Opperthauser |
| 6,398,271 B1 | | 6/2002 | Tomaszewski et al. |
| 7,157,026 B2 | * | 1/2007 | Tibbenham ............. B60R 11/00 264/21 |
| 8,798,858 B2 | * | 8/2014 | Zysk ....................... E05B 81/56 307/326 |
| 2011/0030177 A1 | | 2/2011 | Ukai et al. |

FOREIGN PATENT DOCUMENTS

| | | | |
|---|---|---|---|
| CN | 101985964 A | 3/2011 | |
| CN | 102237577 A | 11/2011 | |
| CN | 102290755 A | 12/2011 | |
| CN | 102683908 A | 9/2012 | |
| CN | 103047233 A | 4/2013 | |
| CN | 103132816 A | 6/2013 | |
| CN | 103909845 A | 7/2014 | |
| CN | 102947604 B | * 12/2015 | .......... F16B 19/1081 |
| CN | 105696886 A | 6/2016 | |
| CN | 106285242 A | 1/2017 | |
| CN | 107060536 A | 8/2017 | |
| CN | 109312766 A | 2/2019 | |
| DE | 698 03 060 T2 | 7/2002 | |
| DE | 202 01 149 U1 | 7/2003 | |
| DE | 10 2004 003 907 A1 | 8/2005 | |
| DE | 10 2007 031 161 A1 | 1/2009 | |
| GB | 2 419 157 A | 4/2006 | |
| JP | 2009-35987 A | 2/2009 | |
| KR | 1998 0044145 A | 9/1998 | |
| KR | 10-2005-0043198 A | 5/2005 | |
| KR | 10-2009-0063485 A | 6/2009 | |
| WO | WO 2004/108481 A1 | 12/2004 | |

OTHER PUBLICATIONS

German Search Report issued in German application No. 10 2019 109 763.0 dated Dec. 3, 2019, with Statement of Relevancy (Ten (10) pages).

English-language Chinese Office Action issued in Chinese application No. 202080027811.4 dated Aug. 9, 2022 (Ten (10) pages).

* cited by examiner

CLIP AND A MOTOR VEHICLE PROVIDED WITH THE CLIP

BACKGROUND AND SUMMARY OF THE INVENTION

The invention relates to a clip and also to a motor vehicle in which the clip is used.

Clips which are used for mounting components are already known.

It is also already known that motor vehicles have a body which can be closed, at its rear, by a pivotable luggage compartment cover or a pivotable tailgate. A part of a lock is formed at a free, lower end of the luggage compartment cover or of the tailgate. In the case of a closed luggage compartment cover or a closed tailgate, this part of the lock is located in a locking position with a counterpart, which is fixed to the body, of the lock.

The lock generally has a rotary latch which, in the locking position of the lock, comes into engagement with a closing bolt which is fixed to the body or a striker. Unlocking of the lock is usually effected via a motor, the actuation of which may be effected via radio or by the actuation of a button arranged on the outer side of the luggage compartment cover or of the tailgate.

The unlocking of the lock is normally effected by a measure outside of the body. In some cases, however, it may be necessary for unlocking of the lock to additionally be possible inside an interior space of the body.

It is an object of the invention to provide a clip which can be easily assembled and which, in the assembled state, is stable in the case of tensile loading and is fixedly arrested in the assembly opening.

It is an object of the invention to provide a motor vehicle having a luggage compartment cover or a tailgate, in the case of which a Bowden cable for manual unlocking of the luggage compartment cover or of the tailgate is securely mounted.

A clip according to the invention has a housing with a passage opening. The housing is advantageously surrounded by a closed frame or is a constituent part of the closed frame. The frame has two lateral portions. The two lateral portions are connected to one another by an arcuate portion, wherein the arcuate portion is formed opposite the housing. The closed frame has a spring action and can be deformed elastically at the level of the two laterally running portions. A projection which protrudes from the clip and which is intended to engage at the intended assembly point with a hooking-behind action is formed on the two lateral portions in each case on the outer surface pointing away from the frame.

In an advantageous embodiment, in each case at least one reinforcing rib is formed on an inner surface of the frame on the respective lateral portion. A spring rate of the clip can be set by the reinforcing rib.

The respective reinforcing rib advantageously runs from a respective end, which is close to the housing, of the respective lateral portion up at least to a respective end of the respective projection at the level of the respective contact surface of the respective projection.

Advantageously, the clip is produced from POM or polyoxymethylene.

In an advantageous embodiment, the clip is used to fasten a Bowden cable to a component. For this purpose, the housing of the clip has a receptacle for a Bowden cable sheath of the Bowden cable.

In an advantageous embodiment, the arcuate portion of the frame is formed as a semicircle with a predetermined radius.

Advantageously, the clip is used to mount an end of the Bowden cable sheath on a body component of an interior space of a luggage compartment or the like of a motor vehicle.

In an advantageous embodiment, a Bowden cable rope is guided through the passage opening of the housing of the assembled clip. The Bowden cable rope runs up to an intended attachment location in the luggage compartment of the motor vehicle. An actuating handle is fastened to the end of the Bowden cable rope.

A motor vehicle according to the invention has a body opening on a rear portion of a body. The body opening can be locked by a luggage compartment cover or a tailgate via a lock. An end of a Bowden cable rope of a Bowden cable is arranged on the lock for manual unlocking of the lock. An end, which is spaced apart therefrom, of a Bowden cable sheath of the Bowden cable is advantageously mounted on the body via the clip. The Bowden cable rope is guided through the clip. An actuating handle is fastened to the end of the Bowden cable rope in order to pull on the Bowden cable rope to unlock the lock.

One embodiment of the invention will be described by way of example below with reference to the drawings.

DETAILED DESCRIPTION OF THE DRAWINGS

Figure 1:
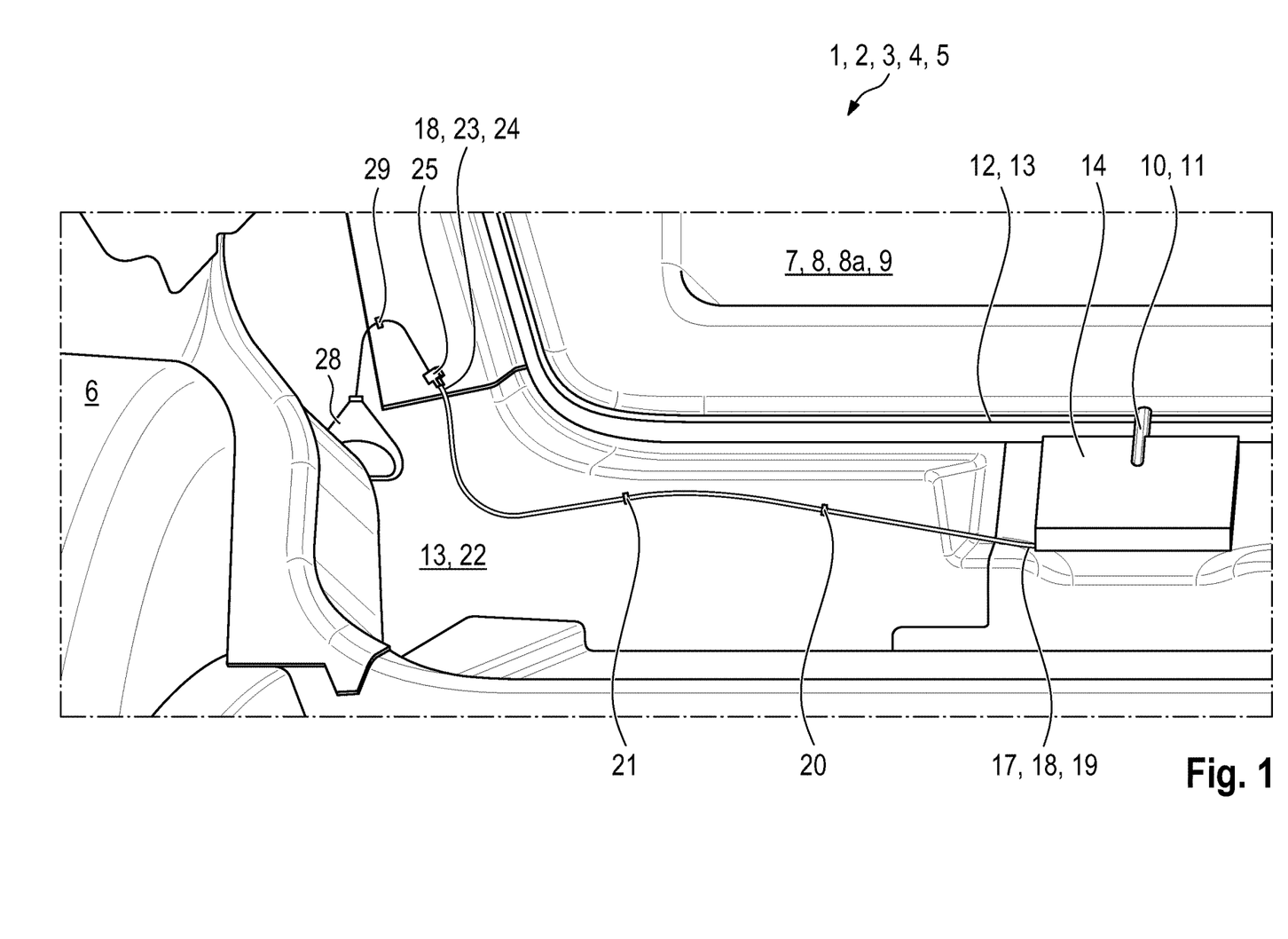
FIG. 1 shows a perspective view of a corner region of a luggage compartment which is closed by a luggage compartment cover, wherein the luggage compartment cover is locked to a body via a lock, wherein an end of a Bowden cable is arranged on the lock for manual unlocking of the lock and a handle for actuation of the Bowden cable is arranged at an end, which is situated opposite thereto, of the Bowden cable.

FIG. 1 shows a corner region 2 of an interior space 3 of a luggage compartment 4. The luggage compartment 4 is a constituent part of a body 5 of a motor vehicle 1. In FIG. 1, a wheel arch 6 can be seen on the left-hand side. A lower end of a luggage compartment cover 8 is also illustrated in FIG. 1.

The luggage compartment cover 8 is located in a closed position 9 which closes the luggage compartment 4. A protruding striker 11 is arranged on an end side 10 of the lower end 7 of the luggage compartment cover 8. Opposite the striker 11, a lock 14 is fastened to an edge 12 of a body opening 13. The lock 14 has a rotary latch (not illustrated) which locks the striker 11.

In the embodiment shown, at a lower edge 15 of a housing 16 of the lock 14, an end 17 of a Bowden cable 18 is arranged on an actuating device 19. The actuating device 19 can be used to move the rotary latch (not illustrated) from the locking position into an unlocking position.

The Bowden cable is fastened to a wall 22 of the body opening 13 via a plurality of clips 20, 21. An end 23 of a Bowden cable sheath 24 of the Bowden cable 18 is arranged on a spring clamp or a clip 25 in a form-fitting manner. A Bowden cable rope 26, which is guided in the Bowden cable 18, is guided through the clip 25 and fastened by way of its end 27 to an actuating handle 28.

In the embodiment shown, a guide clip 29 is fastened to the wall 22 of the body opening 13, such that the actuating handle 28 is arranged at the level of the lower edge 12 of the body opening 13.

Figure 2:
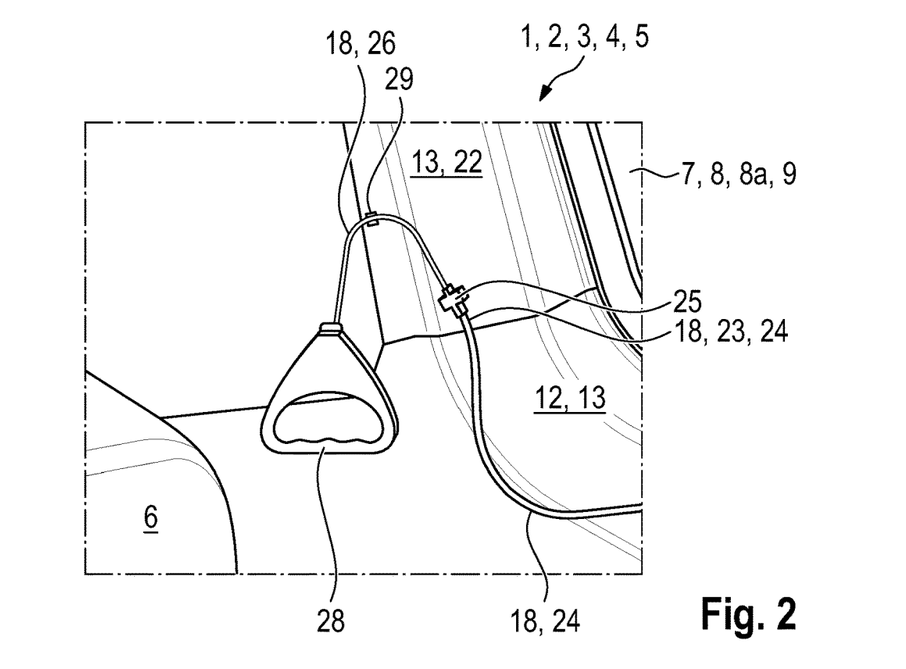
FIG. 2 shows an enlarged view of the region of FIG. 1 at which the one end of the Bowden cable is fastened to the body via a clip, wherein the Bowden cable sheath is supported on one side of the clip and, on the other side of the clip, the Bowden cable rope is guided through the clip up to the actuating handle.

FIG. 2 shows an enlarged illustration of the arrangement of the clip 25 on the wall 22 of the body opening 13, the guide clip 29 and the actuating handle 28. The end 23 of the Bowden cable sheath 24 is also illustrated in FIG. 2.

Figure 3:
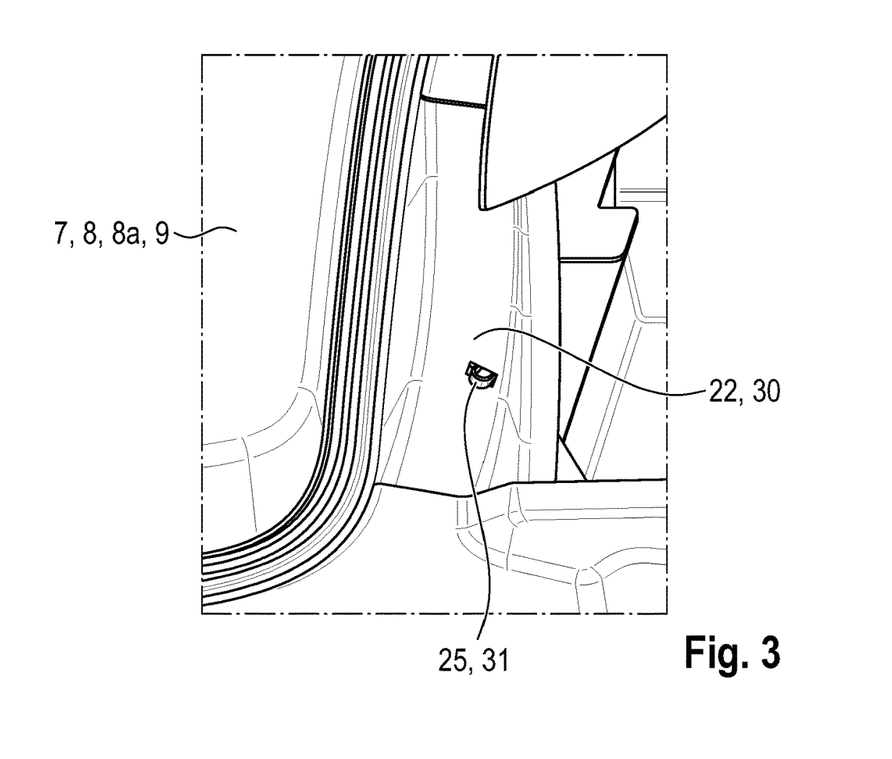
FIG. 3 shows a perspective view of a body component which forms a luggage compartment opening and which is arranged adjacent to a lower end of the luggage compartment cover, wherein the body component has a passage opening in which the clip is arranged and protrudes by way of its one end through the passage opening toward the outside.

FIG. 3 shows an outer side 8b of the lower end 7 of the luggage compartment cover 8 in the closed position 9. Formed in the wall 22 of the body opening 13 is a passage opening 30 through which an end 31 of the clip 25 is plugged and protrudes in the direction of a cavity 32 of the body opening 13.

Figure 4:
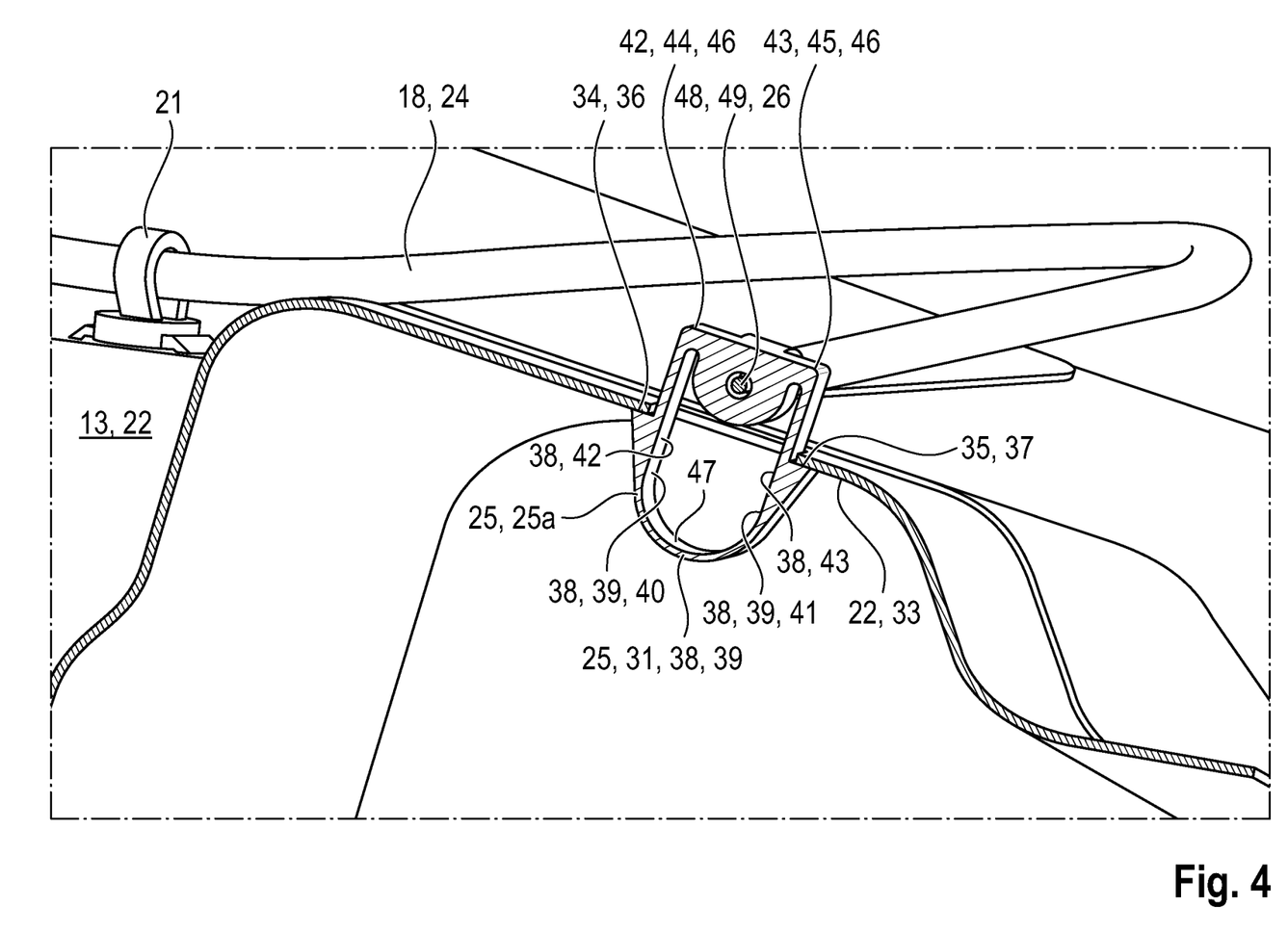
FIG. 4 shows a longitudinal section through the clip, which is located in the installed state of the passage opening of the body part of the luggage compartment opening.
Figure 5:
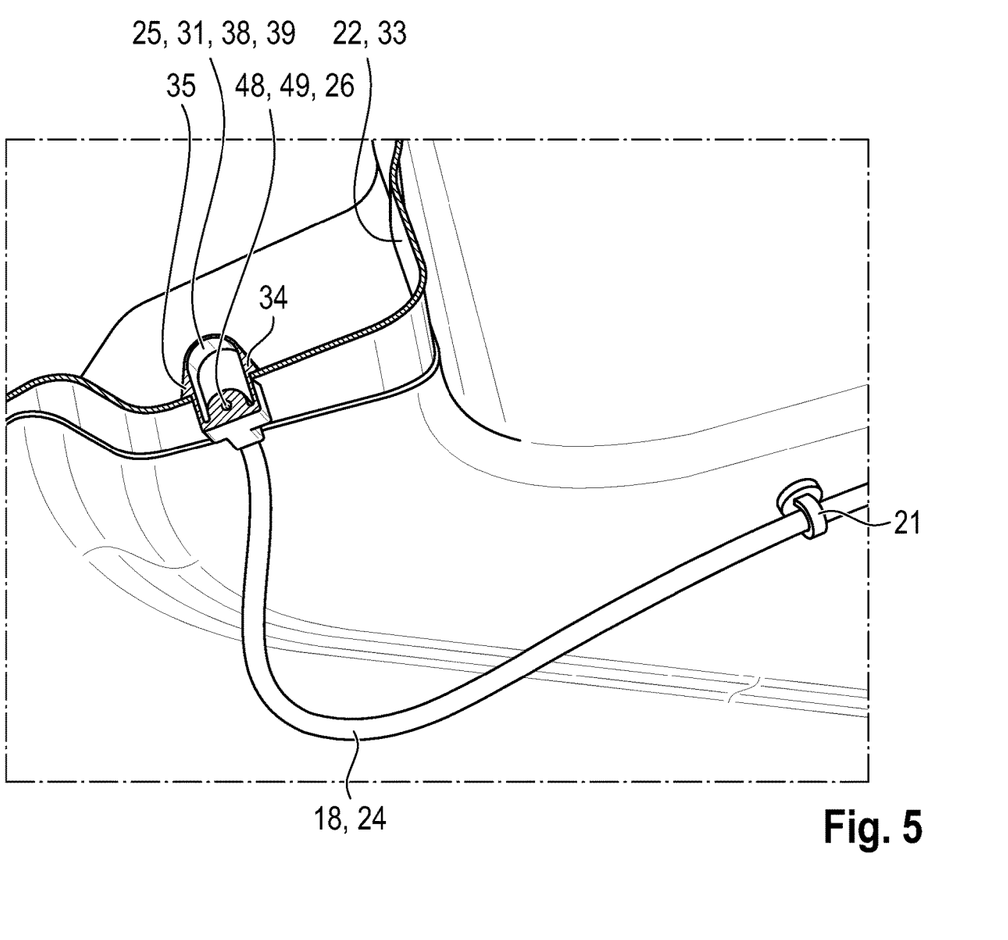
FIG. 5 shows a perspective view of the clip which is installed in the body component for the body opening from a different perspective to that in FIG. 4.

FIG. 4 shows, like FIG. 5, a longitudinal section through the clip 25. FIG. 5 shows the longitudinal section of FIG. 4 from a different perspective. The arcuate end 31 of the clip 25 protrudes on an outer surface 33 of the body 5, the outer surface facing away from the luggage compartment 4. The clip 25 has, on an outer surface 25a, two hooks or projections 34, 35 which protrude from the clip 25.

The respective hook 34, 35 has a contact surface 36, 37 which is rectangular in the plan view. In a side view, the respective hook 34, 35 has a triangular shape in the embodiment shown. The respective contact surface 36, 37 of the respective hook 34, 35 bears against the outer surface 33 of the wall 22.

Figure 6:
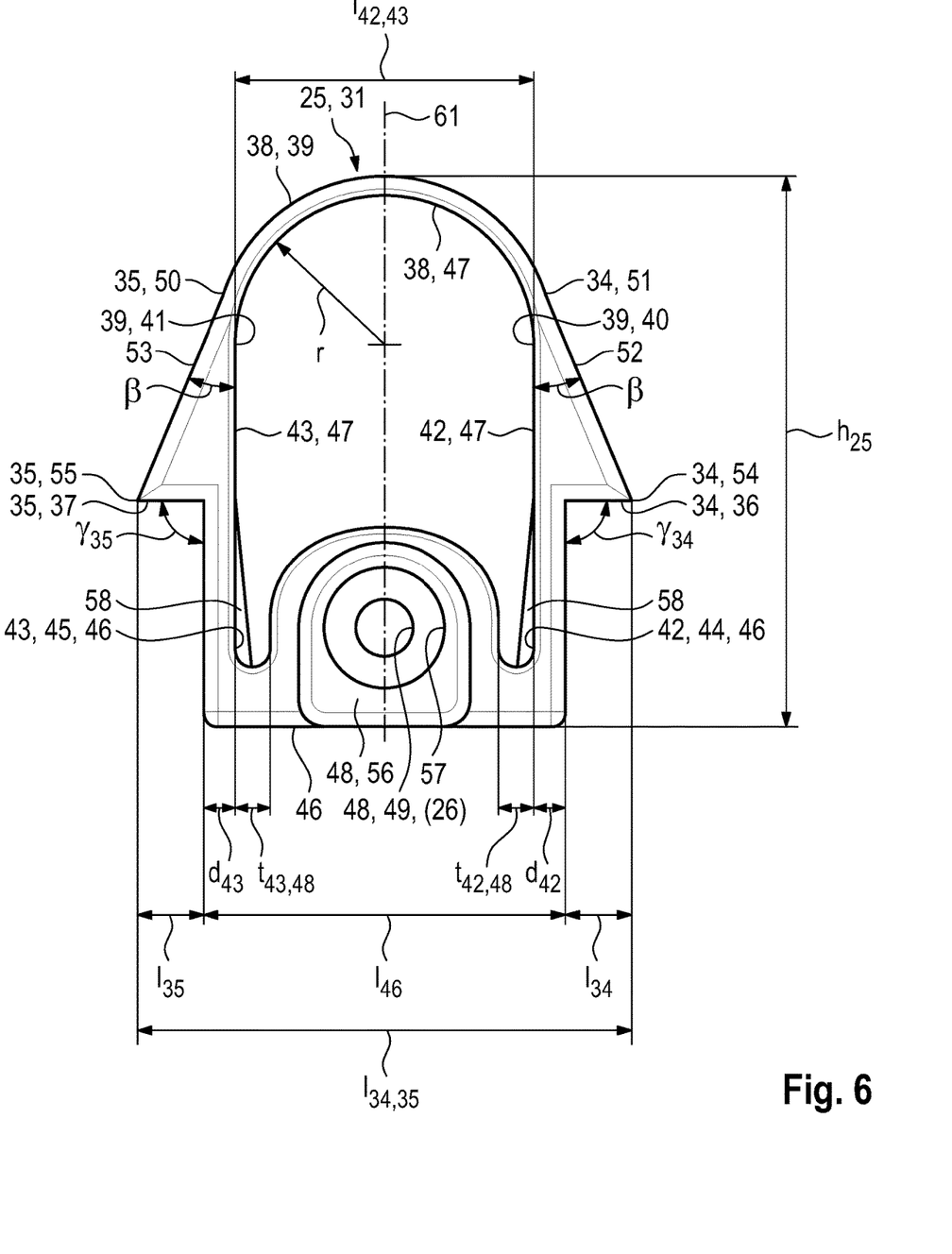
FIG. 6 shows a plan view of the clip, showing the side that serves as a stop for the Bowden cable sheath.
Figure 7:
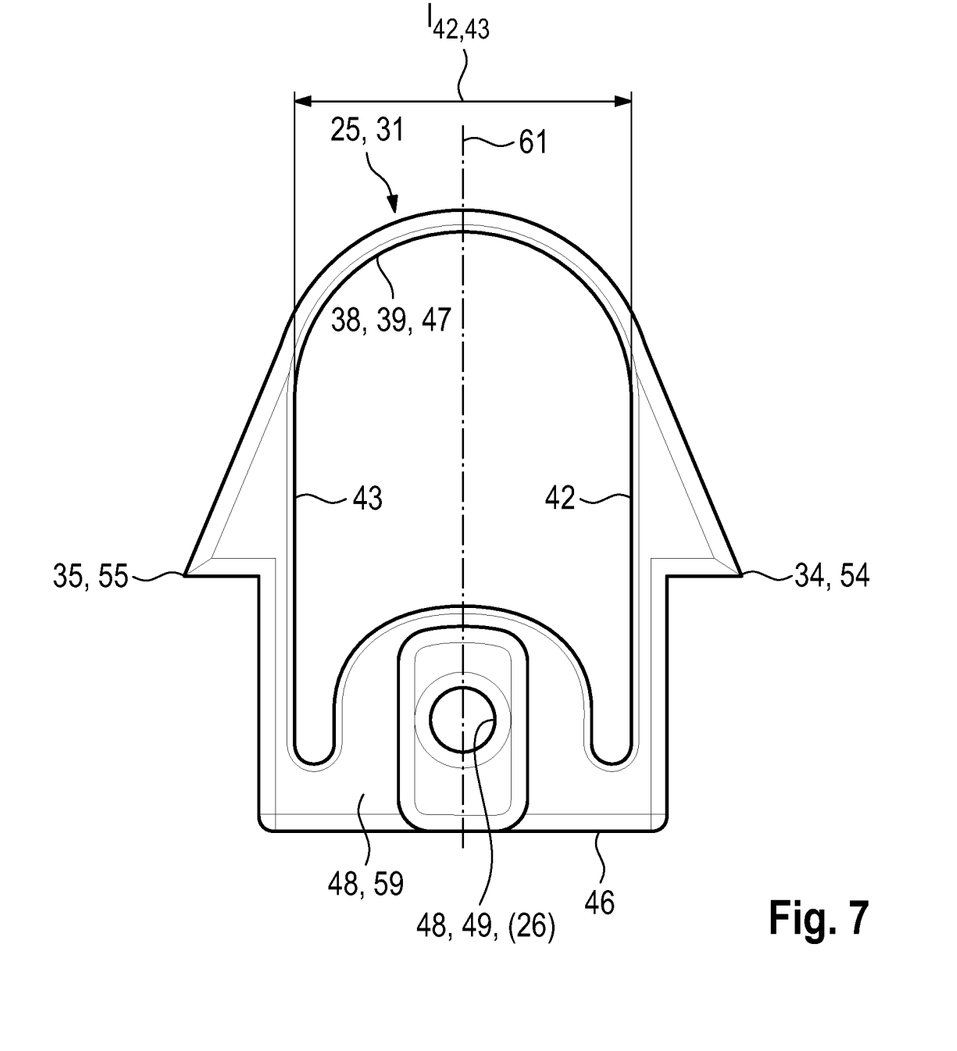
FIG. 7 shows a plan view of the clip, showing the side on which the Bowden cable rope is guided to the handle, and FIGS. 8 and 9 each show a perspective view of the clip.

As emerges from FIG. 4, the clip 25 has a closed frame 38. As is also shown in FIGS. 5, 6 and 7, the closed frame 38 has, at its one end 31, an arcuate or circular-segment-shaped or circular portion 39.

A respective end 40, 41 of the arcuate portion 39 is adjoined in each case by a lateral portion 42, 43. In the embodiment shown, the two lateral (frame) portions 42, 43 run parallel to one another in a rectilinear manner and have the same length.

In another embodiment, the two lateral (frame) portions 42, 43 run at an angle of between 1-10° with respect to an axis of symmetry 61 so as to taper toward the arcuate portion 39.

In a further embodiment, the two lateral (frame) portions 42, 43 have an arcuate curvature in the direction of the arcuate portion 39. The curvature can for example have a radius r which spans the distance between the respective ends 40, 41 of the arcuate portion 39 or the end 50, 51 of the respective projection 34, 35 and the respective upper end 44, 45 of the respective lateral (frame) portions 42, 43.

The two lateral (frame) portions 42, 43 are connected to one another in an integral manner at their respective upper end 44, 45 by a transversely running, rectilinear (frame) portion 46.

A housing 48 with a passage opening 49 is formed in an integral manner on an inner side 47 of the transversely running connecting frame portion 46. The Bowden cable rope 26 is arranged in the passage opening 49. The housing 48 serves as a stop for the Bowden cable sheath 24 of the Bowden cable 18.

FIG. 6 shows a plan view of the clip 25. In the embodiment shown, the arcuate portion 39 is formed as a semicircle with a radius r. In the embodiment shown, the radius r of the arcuate portion 39 is r=10.4 mm±0.2 mm.

An end 50, 51 of the respective projection 34, 35 is located at the level of the ends 40, 41 of the arcuate portion 39. In the embodiment shown, an angle β between the respective lateral portion 42, 43 and a respective obliquely running portion 52, 53 of the respective hook 34, 35 is β=22.5°±2°. In the embodiment shown, the respective hook 34, 35 has a length $l_{34}$, $l_{35}$=2 to 3 mm. In the embodiment shown, an angle $\gamma_{34}$, $\gamma_{35}$ is 90°±2°.

In the embodiment shown, a distance $t_{42,\,48}$, $t_{43,\,48}$ between the housing 48 and the opposite inner surface 47 of the respective lateral portion 42, 43 is $t_{42,\,48}$, $t_{43,\,48}$=1.2 mm±0.2 mm.

In the embodiment shown, a thickness $d_{42}$, $d_{43}$ of the respective lateral portion 42, 43 is $d_{42}$, $d_{43}$=1.1 mm±0.2 mm. In the embodiment shown, a length 146 of the transversely running connecting frame portion 46 is $l_{46}$=12.6 mm±0.5 mm.

In the embodiment shown, a distance 134, 35 between the two ends 54, 55 of the two projections 34, 35 at the level of the respective contact surface 36, 37 is $l_{34,\,35}$=17.1±0.5 mm. A height $h_{25}$ of the clip 25 is $h_{25}$=19.5 mm±0.5 mm.

Figure 9:
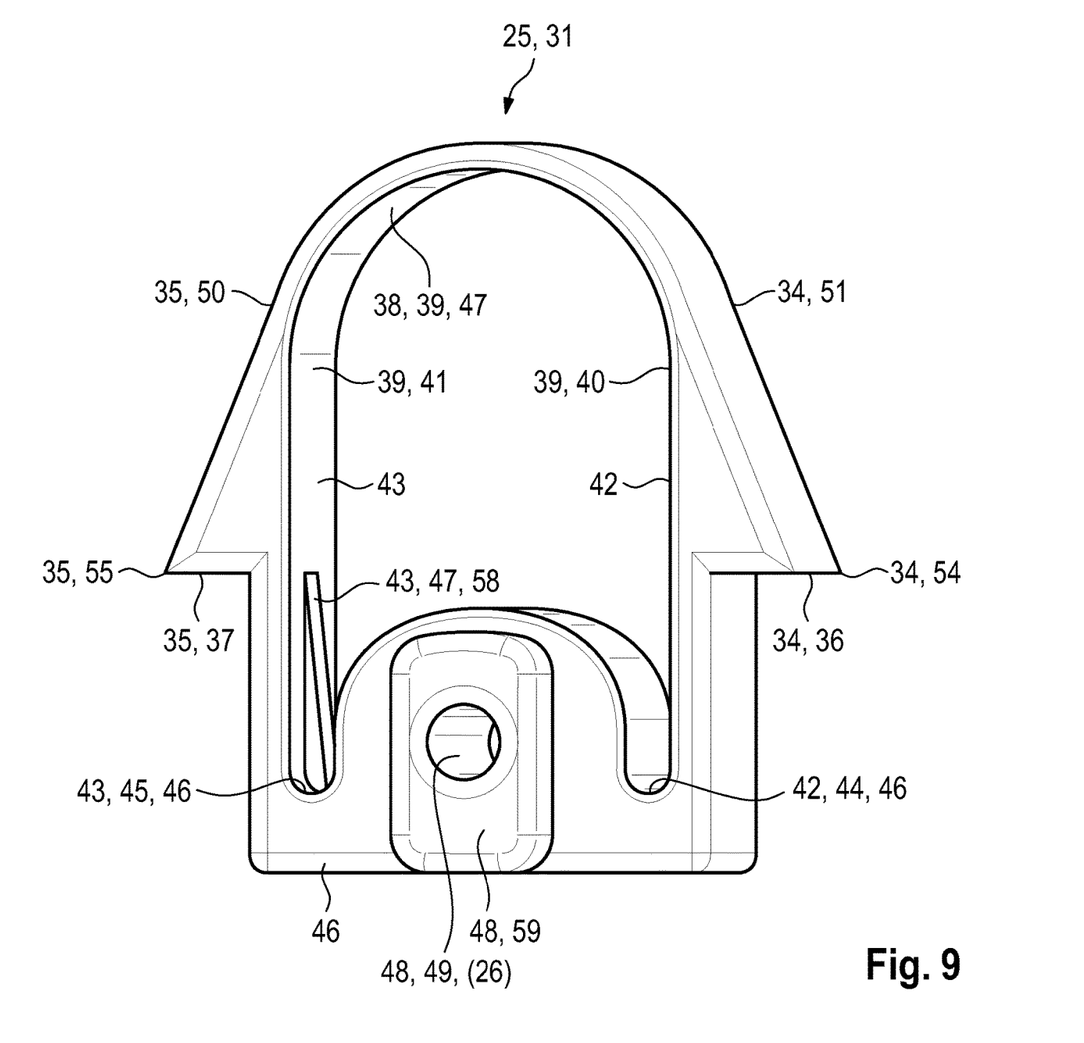

FIG. 6 shows the outer surface 56 of the housing 48, against which an end face of the Bowden cable sheath 24 bears and is mounted through a circular cutout 57 in a form-fitting manner in the embodiment shown. FIG. 6 shows an exemplary illustration of reinforcing ribs 58 which are formed on the lateral portion 43 in an integral manner. A reinforcing rib 58 is also illustrated in FIG. 9.

FIG. 7 differs from FIG. 6 in that an outer surface 59 of the housing 48 is illustrated, the outer surface being situated opposite the outer surface 56. On the side of the housing 48 with the outer surface 59, the Bowden cable rope 26 exits out of the passage opening 49 in the installed state of the clip 25.

Figure 8:
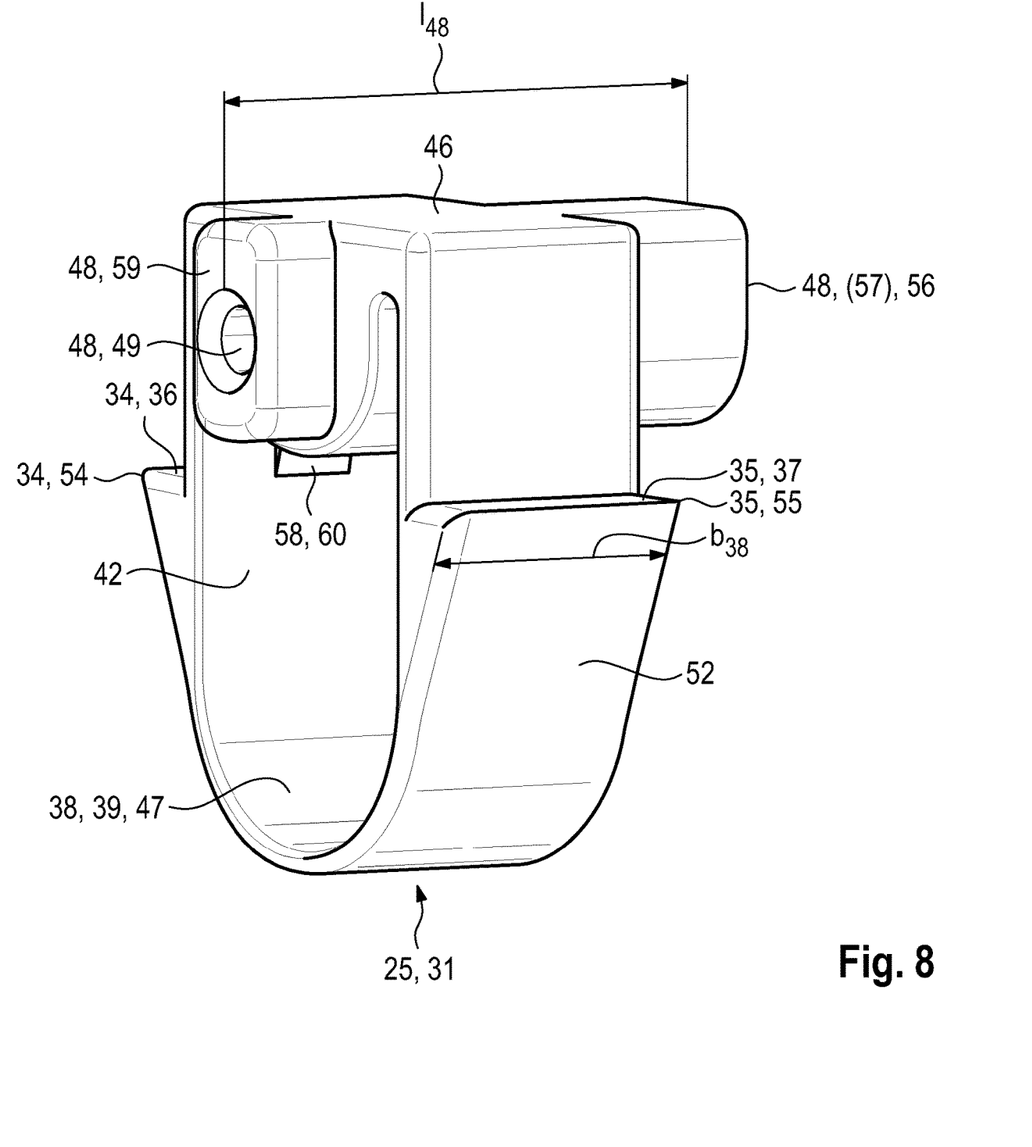

A length of the housing 148 which, in the embodiment shown, is $l_{48}$=16 mm 0.5 mm can be seen from FIG. 8. FIGS. 8 and 9 each illustrate the outer surface 59 of the housing 48. On the side of the housing 48 with the outer surface 59, the Bowden cable rope 26 is guided out of the passage opening 49 in the direction of the actuating handle 28 in the installed state of the clip 25.

An upper end 60 of the reinforcing rib 58 is also illustrated in FIG. 8. In the embodiment shown, a width $b_{38}$ of the frame 38 is 8 mm±0.2 mm.

The assembly of the clip 25 is effected in that the arcuate portion 39 of the clip 25 is guided through the passage opening 30 in the wall 22 of the body opening 13 by way of the two projections 34, 35.

The passage opening 30 in the wall 22 of the body opening 13 is smaller than the distance 134, 35 between the two ends 54, 55 of the two projections 34, 35 at the level of the respective contact surface 36, 37.

The minimum width of the passage opening 30 in the wall 22 of the body opening 13 corresponds to the length $l_{46}$ of the transversely running connecting frame portion 46.

A distance $l_{42, 43}$ between the inner surfaces 47 of the two opposite lateral portions 42, 43 of the frame 38 can be smaller, as a result of the deformation of the arcuate portion 39, than is shown in FIGS. 6 and 7 if the arcuate portion 39 is narrower, that is to say the radius r of the arcuate portion 39 in the direction of the axis of symmetry 61 is greater, than is shown in FIGS. 6 and 7. The arcuate portion 39 has this shape temporarily, for example during the assembly of the clip 25 through the passage opening 30 in the wall 22 of the body opening 13.

The elastic deformability of the two opposite lateral portions 42, 43 and of the arcuate portion 39 has the effect that the two opposite lateral portions 42, 43 and the arcuate portion 39 return to the stress-free initial position shown in FIGS. 6 and 7 during the assembly of the clip 25 in the passage opening 30 in the wall 22 of the body opening 13.

The elastic deformability of the two opposite lateral portions 42, 43 and of the arcuate portion 39 also produces a spring action.

In the case of tensile loading on the clip 25 as a result of the pulling on the actuating handle 28 in the event of emergency unlocking of the lock 14, the hooking-behind action is reinforced since the two opposite lateral portions 42, 43 are held apart from one another by the spring action of the arcuate portion 39.

Due to the spring action of the arcuate portion 39, it is then possible to conduct very high holding forces via the clip 25 into the wall 22 of the body opening 13.

In addition, the spring rate can be set by the reinforcing ribs 58 on both sides. For example, an elongation and/or an increase of the cross section of the respective reinforcing rib 58 increases the spring rate and makes the closed frame 38 stiffer, such that the holding forces via the clip 25 are increased.

What is claimed is:

1. A clip (25), comprising:
   a housing (48) with a passage opening (49); and
   a closed frame (38);
   wherein the closed frame (38) has two laterally running portions (42, 43) and wherein the two laterally running portions (42, 43) are connected to one another at a first end by an arcuate portion (39) of the closed frame (38) which is formed opposite the housing (48);
   wherein the two laterally running portions (42, 43) are connected to one another at a second end by a transversely running frame portion (46);
   wherein a respective projection (34, 35) which protrudes from the clip (25) and which is engageable at an intended assembly point with a hooking-behind action is formed on the two laterally running portions (42, 43) on an outer surface (25a) of the clip (25) pointing away from the closed frame (38);
   wherein the housing (48) is disposed on an inner side of the transversely running frame portion (46) that faces toward the arcuate portion (39) of the closed frame (38) and wherein the housing (48) has an arcuate portion that faces toward the arcuate portion (39) of the closed frame (38) and that faces toward the respective projection (34, 35) formed on the two laterally running portions (42, 43);
   wherein the closed frame (38) has a spring action and is deformable elastically at a level of the two laterally running portions (42, 43).

2. The clip according to claim 1, wherein a respective reinforcing rib (58) is formed on an inner surface (47) of the closed frame (38) on the two laterally running portions (42, 43) and wherein a spring rate of the clip (25) is settable by the respective reinforcing rib (58).

3. The clip according to claim 2, wherein the respective reinforcing rib (58) runs from a respective end (44, 45) which is close to the housing (48) of the respective laterally running portion (42, 43) up at least to a respective end (54, 55) of the respective projection (34, 35) at a level of a respective contact surface (36, 37) of the respective projection (34, 35).

4. The clip according to claim 1, wherein the clip (25) is produced from polyoxymethylene.

5. The clip according to claim 1 in combination with a Bowden cable (18) and a component (22), wherein the clip fastens the Bowden cable (18) to the component (22) and wherein the housing (48) of the clip (25) has a receptacle (57) which receives a Bowden cable sheath (24) of the Bowden cable (18).

6. The clip according to claim 1, wherein the arcuate portion (39) of the closed frame (38) is formed as a semicircle.

7. The clip according to claim 1 in combination with a Bowden cable (18) and a body component (22) of an interior space (3) of a luggage compartment (4) of a motor vehicle (1), wherein the clip mounts an end (24b) of a Bowden cable sheath (24) of the Bowden cable (18) on the body component (22).

8. The clip in combination with the Bowden cable (18) and the body component (22) according to claim 7, wherein a Bowden cable rope (26) of the Bowden cable (18) is guided through the passage opening (49) of the housing (48) of the clip (25), wherein the Bowden cable rope (26) runs up to an intended attachment location in the luggage compartment (4) of the motor vehicle (1), and wherein an actuating handle (28) is fastened to an end of the Bowden cable rope (26).

9. A motor vehicle (1), comprising:
   a body opening (13) on a rear portion of a body (5) of the motor vehicle, wherein the body opening (13) is lockable by a luggage compartment cover or a tailgate (8) via a lock (14); and
   a Bowden cable (18) with a Bowden cable rope (26) and a Bowden cable sheath (24), wherein an end of the Bowden cable rope (26) is disposed on the lock for manual unlocking of the lock (14) and wherein an end (24b) of the Bowden cable sheath (24) is mounted on the body (5) via the clip (25) according to claim 1;
   wherein the Bowden cable rope (26) is guided through the clip (25) and wherein an actuating handle (28) is fastened to the end of the Bowden cable rope (26) in order to pull on the Bowden cable rope (26) to unlock the lock (14).

* * * * *